(Model.)
C. D. HASKINS.
MICROPHONE.
No. 266,286. Patented Oct. 24, 1882.
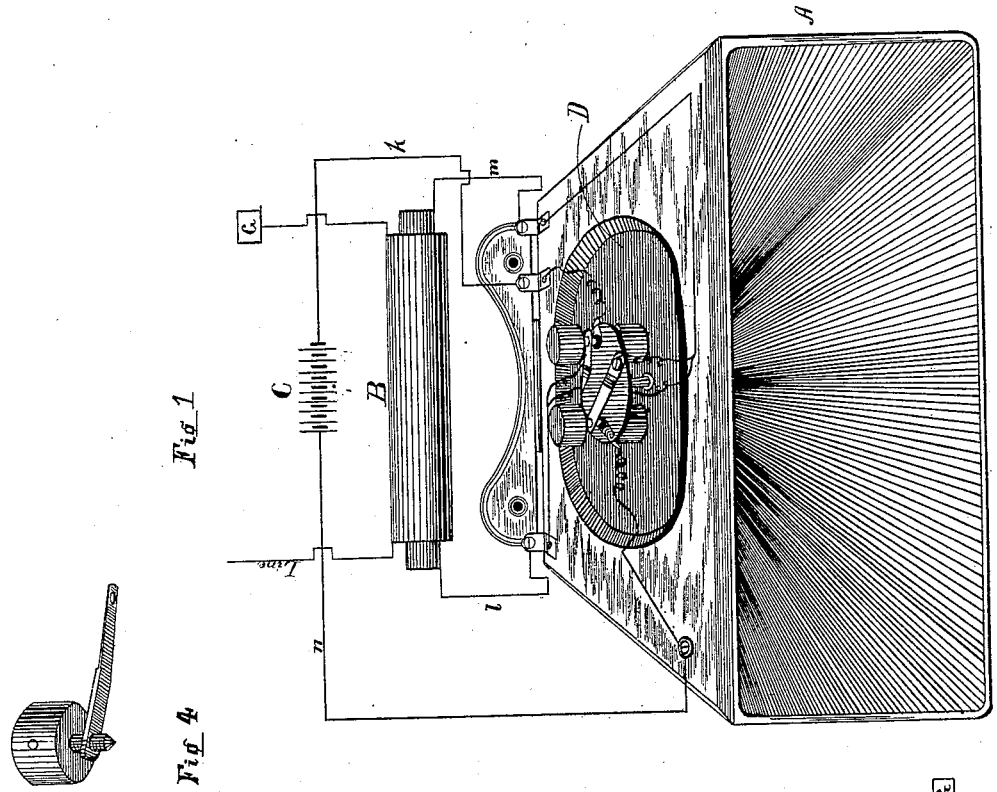
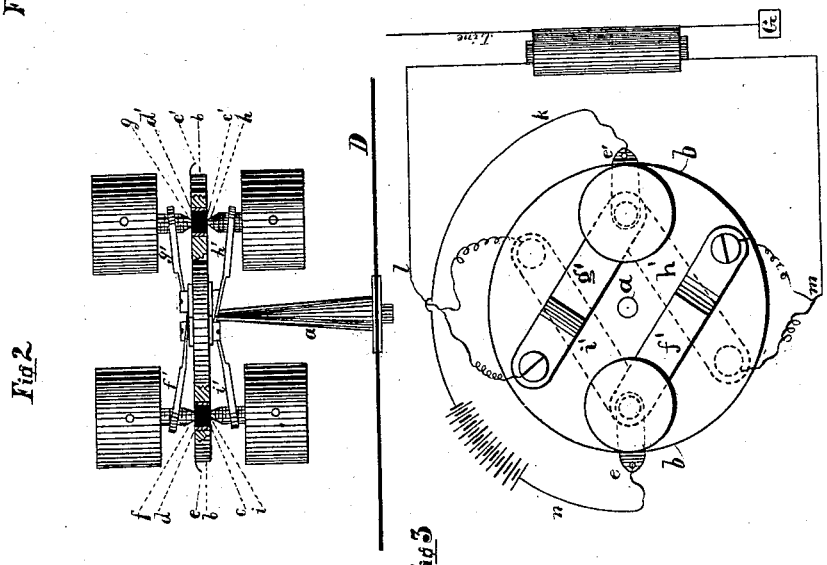
Witnesses.
William S. Granger
Charles E. Scribner
Inventor
Cha's D. Haskins
By George P. Barton
Attorney

UNITED STATES PATENT OFFICE.

CHARLES D. HASKINS, OF NEW YORK, N. Y., ASSIGNOR, BY MESNE ASSIGNMENTS, TO THE WESTERN ELECTRIC COMPANY, OF CHICAGO, ILLINOIS.

MICROPHONE.

SPECIFICATION forming part of Letters Patent No. 266,286, dated October 24, 1882.

Application filed July 8, 1881. (Model.)

*To all whom it may concern:*

Be it known that I, CHAS. D. HASKINS, of the city and county of New York, in the State of New York, have discovered a certain new and useful Improvement in Microphones, of which the following is a full, clear, concise, and exact description.

My invention relates to carbon telephone-transmitters; and it consists in so arranging the electrodes that the local circuit will be sent in undulatory reversals through the primary of the induction-coil by the vibrations of the diaphragms.

Figure 1 is a full-sized perspective of a microphone embodying my improvements. Fig. 2 is an elevation of certain portions thereof on a scale double that of Fig. 1. Fig. 3 is a plan showing the connections in detail. Fig. 4 is a perspective of a metallic spring carrying a screw or point. The screw may be provided with a cylindrical head, as shown, in which may be provided one or more holes. By inserting a lever in one of the holes the screw may be adjusted.

The same parts are indicated by similar letters of reference in the different figures of the drawings.

A is the mouth-piece. B is the induction-coil, and C the battery in the local circuit. The diaphragm D is of the usual form. The stud $a$ supports the rubber disk $b$. Two carbon pieces, $c\ c'$, are provided in the disk. The pieces of carbon should be surrounded by metallic sheath $d\ d'$, to which connecting-points $e\ e'$ for the local battery may be attached.

The points $f$, $g$, $h$, and $i$ are adjusted to the carbon pieces by means of springs $f'$, $g'$, $h'$, and $i'$, so that the pressure of points $f\ g$ and $h\ i$ will be varied by the vibrations of the diaphragm. When the resistance at points $f\ g$ is increased the resistance at points $h\ i$ is diminished, and when the contacts are best at points $f\ g$ the contacts are poorest at points $h\ i$. These screws, which terminate at points $f\ g\ h\ i$, are weighted with the cylindrical heads. Their inertia will therefore aid materially in effecting the variation of contact of the electrodes. Suppose the contacts at points $f\ g$ to be at their best. The battery-circuit may be traced by line $k$ to contact-point $e'$ and carbon $c'$, thence by contact-point $g$ and spring $g'$ to line $l$, and thence through the induction-coil, and thence by line $m$ to the spring $f'$, and thence by contact-point $f$ to carbon $c$ and contact-point $e$, and thence by line $n$ to the pole of the battery. Suppose the better contact were at the points $h\ i$. The battery would then find circuit from one pole by line $k$ to contact-point $e'$ and carbon $c'$, and thence by contact-point or screw $h$ and spring $h'$ to wire $m$ through the primary coil, and by wire $l$, spring $i'$, and point $i$ to carbon $c$, and thence by contact-point $e$ and wire $n$ to its other pole. The vibrations of the diaphragm thus cause the local circuit to be sent in undulatory reversals through the primary of the induction-coil.

I claim—

1. The combination of the battery included in the circuit between the electrodes, branch connections, substantially as shown and described, and the weighted electrodes supported entirely by the diaphragm, whereby the current of the battery may be sent in undulatory reversals through that portion of the battery-circuit included between the said branch connections.

2. The combination of two carbon pieces with four contact-points, two points for each carbon piece, the diaphragm, primary of induction-coil, and circuit-connections, as described, whereby the current of the local battery is sent in undulatory reversals, as and for the purpose set forth.

3. The combination of battery C in the circuit of line $k\ n$, the line $l\ m$, including the primary of the induction-coil, the branch connections, main line, secondary of induction-coil, electrodes, and diaphragm, whereby induced currents may be sent to line in undulatory reversals, as and for the purpose specified.

4. The combination of conducting-springs $f'\ g'\ h'\ i'$, supporting the contact-points $f\ g\ h\ i$, respectively, provided with weighted heads, the carbon pieces $c\ c'$, the disk supported at the center by the stud $a$, the diaphragm, and circuits, substantially as shown and described.

CHAS. D. HASKINS.

Witnesses:
- WM. P. ILLENSWORTH,
- O. K. DEUTSCH.